United States Patent
Catalano et al.

(10) Patent No.: US 11,765,075 B1
(45) Date of Patent: Sep. 19, 2023

(54) AUTOMATIC TOLLING IN TRAVERSAL OF A NETWORK

(71) Applicant: INTERNATIONAL BUSINESS MACHINES CORPORATION, Armonk, NY (US)

(72) Inventors: Pasquale A. Catalano, Wallkill, NY (US); Michael James Becht, Poughkeepsie, NY (US); Christopher J Colonna, Ossining, NY (US); Stephen Robert Guendert, Murfreesboro, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/938,766

(22) Filed: Oct. 7, 2022

(51) Int. Cl.
*H04L 29/06* (2006.01)
*H04L 45/302* (2022.01)
*H04L 45/00* (2022.01)
*G06Q 10/00* (2023.01)

(52) U.S. Cl.
CPC .......... *H04L 45/302* (2013.01); *H04L 45/566* (2013.01)

(58) Field of Classification Search
CPC ...... H04L 45/302; H04L 29/06; H01L 45/566
USPC ........................................................ 709/239
See application file for complete search history.

(56) References Cited

U.S. PATENT DOCUMENTS

| | | | |
|---|---|---|---|
| 9,197,599 B1* | 11/2015 | Barry | H04L 63/0823 |
| 9,336,250 B1 | 5/2016 | Shaikh et al. | |
| 9,532,161 B2 | 12/2016 | Raleigh | |
| 9,800,639 B2 | 10/2017 | Gordon | |
| 10,356,223 B1 | 7/2019 | Kuo et al. | |
| 11,196,653 B2 | 12/2021 | Williams et al. | |
| 2019/0012909 A1* | 1/2019 | Mintz | G08G 1/0112 |
| 2019/0228593 A1 | 7/2019 | Liu et al. | |
| 2020/0234582 A1* | 7/2020 | Mintz | G08G 1/096811 |
| 2022/0319312 A1* | 10/2022 | Mintz | G07B 15/06 |

OTHER PUBLICATIONS

"Infrastructure as a Service (IaaS)," Portland State Computer Science, 2017 (no further date information available), pp. 1-39.
Anonymous, "Fully Decentralized Cloud using Generalized Trusted Execution Environments and Distributed Hash Tables (Without Blockchain)," IP.com No. IPCOM000264923D, Feb. 5, 2021, pp. 1-6 (+ cover).
Anonymous, "Infrastructure Resources Auto-Plan and Auto-Management Platform in Cloud Computing," IP.com No. IPCOM000264627D, Jan. 14, 2021, pp. 1-2 (+ cover).
Anonymous, "Method and Apparatus for a Secure, Centralized Hybrid Multicloud Data Registry and Repository," IP.com No. IPCOM000264374D, Dec. 8, 2020, pp. 1-4 (+ cover).

(Continued)

*Primary Examiner* — Jude Jean Gilles
(74) *Attorney, Agent, or Firm* — Tihon Poltavets, Esq; Blanche E. Schiller, Esq.; Heslin Rothenberg Farley & Mesiti P.C.

(57) ABSTRACT

A packet of data is obtained at one device of a network. A path from the one device to a next device of the network is determined, as well as at least one toll value for the path from the one device to the next device. Based on the at least one toll value for the path from the one device to the next device, a routing toll is adjusted. The routing toll is stored in a frame used in routing the packet of data in the network.

20 Claims, 7 Drawing Sheets

(56) References Cited

OTHER PUBLICATIONS

Anonymous, "Method of Storage Area Network (SAN) Notification of Storage Volume Degradation," IP.com No. IPCOM000265618D, Apr. 29, 2021, pp. 1-5 (+ cover).
Obrutsky, Santiago Lucas, "Cloud Storage: Advantages, Disadvantages and Enterprise Solutions for Business," Eastern Institute of Technology, Jul. 2016, pp. 1-9.
Sasongko, Hariyo et al., "Cloud-Based NAS (Network Attached Storage) Analysis as an Infrastructure as a Service (IAAS) Using Open Source NAS4FREE and Owncloud," IT Journal Research and Development (ITJRD), vol. 6, No. 2, Mar. 2022, pp. 83-97.

\* cited by examiner

AUTOMATIC TOLLING IN TRAVERSAL OF A NETWORK

BACKGROUND

One or more aspects relate, in general, to facilitating processing within a computing environment, and in particular, to facilitating processing relating to traversal of a network of the computing environment.

Some computing environments provide Infrastructure as a Service (IaaS), in which compute, storage and/or networking resources are provided on demand and charged based on utilization. For such environments, charging based on use can be difficult, especially when there are many users using the same resources.

SUMMARY

Shortcomings of the prior art are overcome, and additional advantages are provided through the provision of a computer-implemented method of facilitating processing within a computing environment. The computer-implemented method includes obtaining, at one device of a network, a packet of data and determining a path from the one device to a next device of the network. At least one toll value for the path from the one device to the next device is determined and based on the at least one toll value for the path from the one device to the next device, a routing toll is adjusted. The routing toll is stored in a frame used in routing the packet of data in the network.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one or more aspects, processing within a computing environment is facilitated. As an example, processing relating to traversal of a network of the computing environment is facilitated. A capability is provided, in or more aspects, to perform tolling (e.g., automatically) as a packet of data is routed through a network. For instance, an automated tolling mechanism is provided that accounts for use of different parts of the network as a packet traverses through the network. This enables accurate invoicing for the utilization of network resources in the routing of the packet.

In one example, each selected connection of a network (e.g., each or selected inter-switch links (ISL) or other connections) has at least one toll value associated therewith, which is used to determine a toll should that connection be traversed in routing a packet. For instance, a connection between device A of a network and device B of the network is assigned at least one toll value. The toll value assigned to a particular connection is based on, for instance, one or more of: a length of the connection, the speed of the connection, bandwidth (trunk/port channels link count), usage, user input, service provider input, etc. Additional, fewer and/or other factors may be considered when assigning a toll value. Further, a connection may have one toll value for a packet travelling in one direction (e.g., A to B) and another toll value for the opposite direction (e.g., B to A). Moreover, a connection may be assigned a static value that does not change based on changing factors or a dynamic value that does change depending on the factors. As examples, a particular link may have one toll value based on one time of day (e.g., peak hours) and another toll value based on another time of day (e.g., non-peak hours); may have a toll value that changes based on congestion of the connection, etc.; may have one or more toll values associated therewith depending on one or more factors. Many variations are possible.

As examples, the toll value may be a cost for that connection (e.g., a fee or toll for using that connection, e.g., a monetary value) or the toll value may be a weight (e.g., a numerical value), which is used to determine a cost for that connection. For instance, a mathematical equation or formula may be applied to the weight to determine the cost. As an example, the weight may be multiplied by a number to obtain the cost. In one or more examples, the weight may be static, but the determination of the cost based on the weight might be dynamic to adjust for changing factors. In other examples, the weight is dynamic and changes based on one or more factors. Many possibilities exist for determining the cost based on a weight. Further, many possibilities exist as example toll values, each of which may be static or dynamic.

In one or more examples, components, in addition to or in lieu of connections, may have toll values associated therewith. As examples, network appliances that have security and/or analytics, other network appliances, devices, etc. may have a toll value assigned thereto. In such cases, each toll value for each component that is part of the route is used to determine a toll. Many examples are possible.

Further, in one or more aspects, a capability is provided to enable different routing policies to be used, e.g., for different users, to route packets through the network. As examples, one routing policy optimizes latency at a higher cost, while another routing policy optimizes cost (e.g., lower cost) at a possible higher latency. The user is able to set one or more policies that determine or affect cost for traversal of a packet. A policy may be static or dynamic; it may be for a given time of day, given day, type of packet or any other basis in which a policy may be set for a packet. For instance, a policy may be set for high-peak hours in which the fastest route is taken regardless of costs and another policy may be set for low-peak hours in which the least expensive route is to be taken. Many different policies may be supported, and a user may define one or more policies for the traversal of their packets.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing a process (or multiple processes) that, e.g., performs automatic tolling and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as tolling code or tolling module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

Figure 1:
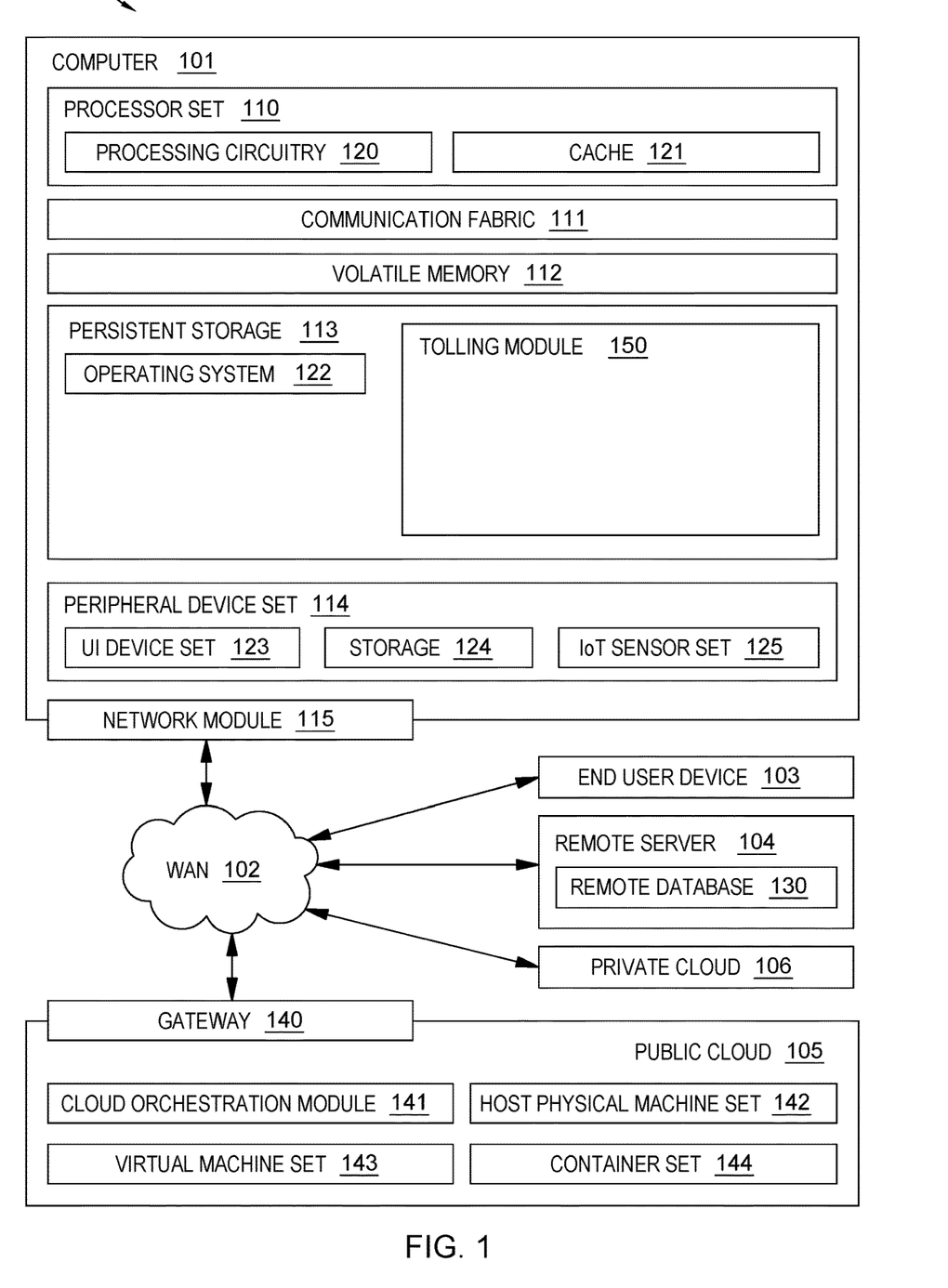
FIG. 1 depicts one example of a computing environment to perform, include and/or use one or more aspects of the present invention.

Further details relating to one or more components/modules of FIG. 1 used in accordance with one or more aspects of the present invention are described herein. For example, storage 124 is provided, in one example, by a storage network, such as a storage area network (SAN). In one example, a storage area network includes a plurality of devices coupled to one another via a plurality of connections. As examples, the plurality of devices includes endpoint devices (e.g., servers, such as computer 101; one or more processors of processor set 110; remote servers, such as remote server 104; and/or end user devices, such as end user device 103; etc.), network devices (e.g., switches, directors, etc.) and/or other devices; and the connections include, for instance, links and/or other connections. Many examples are possible.

One example of a storage area network is described with reference to an example schematic diagram depicted in FIG. 2. In one example, a storage area network 200 includes a plurality of end devices (also referred to as endpoint devices) 210, 220 connected to one or more network devices 230. Network devices 230 include, for instance, memory circuitry and processing circuitry. In accordance with one or more aspects of the present invention, the memory circuitry is used to store, for instance, a tolling module, such as tolling module 150, and the processing circuitry is used to execute the code or instructions of the tolling module to perform tolling, as described herein. The network topology of storage area network 200 may be a switched fabric, where network devices 230 are switches. In one or more embodiments, at least one of end devices 210, 220 is configured as a host device. For instance, end device 210 is configured as a host device. The host device is embodied, for instance, in a computer system or computing environment. As examples, the host device may be a computer, such as computer 101, a processor, such as a processor of processor set 110, an end user device, such as end user device 103, or other devices of a computing environment, such as computing environment 100.

As examples, network devices 230 support the Fibre Channel (FC) and/or Fibre Channel over Ethernet (FCoE) protocols. For example, a particular fixed port network device may support the Fibre Channel protocol and/or the Fibre Channel over Ethernet protocol. Each network device 230 includes a plurality of ports that connect network devices 230 to various end devices 210, 220 via a plurality of links 225. In addition, each end device 210, 220 includes one or more ports that connect the end devices to one or more network devices 230 or to other end devices 210, 220. In one example, each link 225 is defined by the two ports that are connected to a link. The ports of end devices 220, 210 are referred to, in one example, as channel ports, while the ports of network device 230 are referred to, for instance, as switch ports.

Although the Fibre Channel (FC) and/or Fibre Channel over Ethernet (FCoE) protocols are specified herein, one or more of the network devices may support other protocols.

Fibre Channel (FC) and/or Fibre Channel over Ethernet (FCoE) protocols are just examples.

Figure 2:
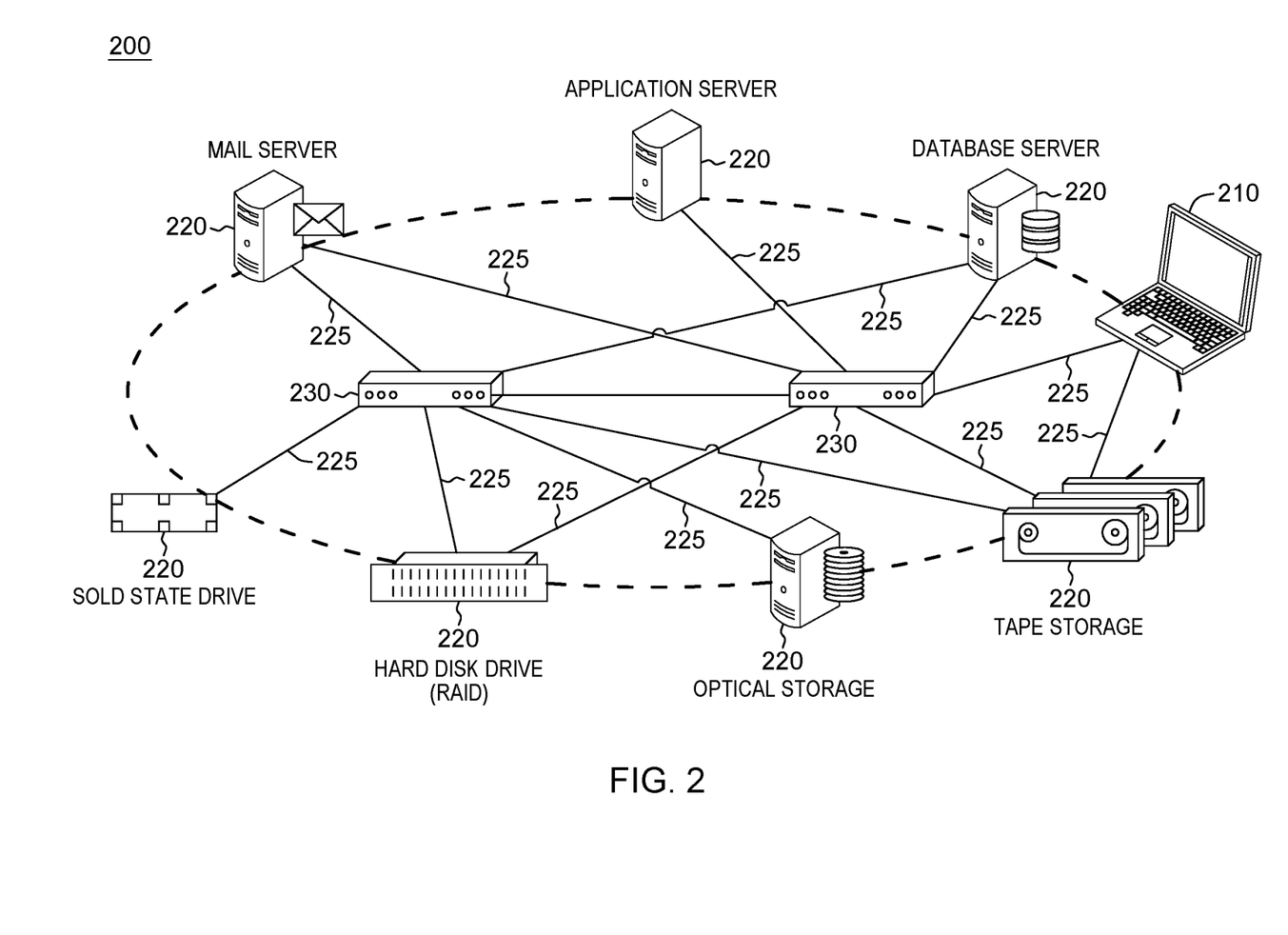
FIG. 2 depicts one example of a network in which tolling may be used, in accordance with one or more aspects of the present invention.

The storage area network of FIG. 2 is only one example. Storage area networks may include additional, fewer and/or other devices and/or connections. Many examples and variations are possible. For instance, the number, type and interconnections of the devices and connections in each storage area network may be different. Further, storage area networks may support other transmission protocols. Again, many variations are possible.

Another example of a storage area network is described with reference to FIG. 3. This configuration is simplified to facilitate description and understanding of aspects of the present invention. The storage area network described in FIG. 3 and/or other storage area networks may include additional, fewer and/or other devices and/or connections. Further, the storage area networks described herein, other storage area networks, other storage networks and/or other types of networks may incorporate and/or use one or more aspects of the present invention.

Figure 3:
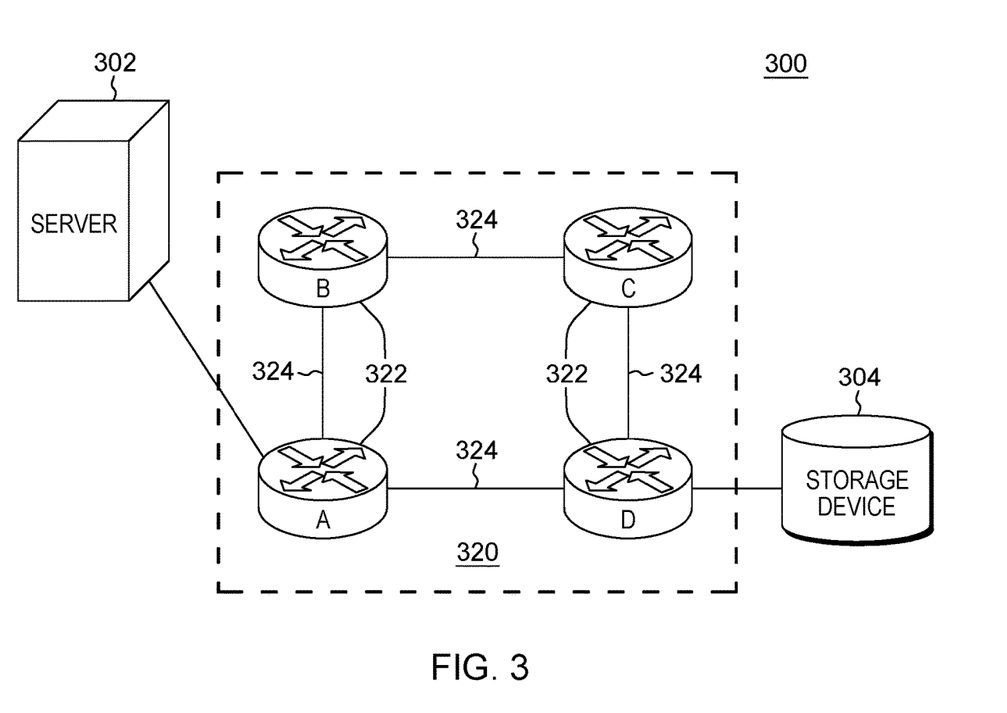
FIG. 3 depicts another example of a network in which tolling may be used, in accordance with one or more aspects of the present invention.

Referring to FIG. 3, a storage area network 300 includes, in one example, a device, such as a server 302 (e.g., computer 101, a processor of processor set 110, remote server 104, end user device 103, as examples) coupled to another device, such as a storage device 304 (e.g., persistent storage 113, such as a disk or tape) via a network fabric, such as a switched fabric 320. Switched fabric 320 includes, for instance, a plurality of network devices 322 (e.g., FICON (Fibre Connection) directors or switches, other directors or switches and/or other network devices) coupled to one another via one or more connections 324 (e.g., inter-switch links, other links and/or other connections).

Storage area network 300, as an example, is used to route data from a source (e.g., server 302) to a destination (e.g., storage device 304). In accordance with an aspect of the present invention, a routing toll is determined based on the route. For instance, each path (or selected paths) of, e.g., the network fabric (or, e.g., the storage area network) from one device to a next device in the route from the source to the destination has at least one toll value associated therewith and those toll values are used to determine the routing toll for the route. As one example, a toll value (e.g., weight, cost, selected value, attribute, etc.) is assigned to each network fabric connection of the route (or selected connections) and as the data traverses a connection, the associated toll value is applied (e.g., added, applied via, e.g., another mathematical operator, a mathematical equation or formula, or otherwise applied) to the routing toll defined for the data being routed. Based on the data being routed and the routing toll being determined, the determined routing toll may be used to determine a toll or cost for routing the data. As an example, if the routing toll is defined as a weight, then the total weight (i.e., the routing toll) may be converted into a toll or cost. For instance, a dollar value may be multiplied by the total weight to determine the toll. In a further example, each weight has a cost associated therewith and to determine the toll, each weight is multiplied by its associated cost to obtain intermediate results. The intermediate results are added to obtain a toll. Other examples are possible in which other operators, mathematical equations or formulas are applied to the weights and/or total weight to obtain the toll or cost. In another example, the routing toll is in terms of costs (e.g., a monetary value) and thus, the amount of the routing toll is the cost or toll. Other examples and variations are possible.

One example of determining a routing toll for a particular route is described with reference to FIG. 3. In one example, the toll value of a connection A to B is 2; the toll value of B to C is 4; the toll value of C to D is 2; and the toll value of A to D is 16. Therefore, if a packet is routed from server 302 to storage device 304 over A to D, the routing toll for that route is 16. Further, if a packet is routed from device 302 to device 304 over A to B, then B to C and then C to D, the routing toll for that route is 8 (2+4+2). The routing toll is then used to determine a toll to be invoiced, as described above.

In another example, a toll value may be assigned to other components (in lieu of one or more connections or in addition to one or more connections) in a route from one device to another device. For instance, if a path from one device to a next device in a route includes a network appliance, as one example, a toll value for that network appliance may be assigned and included in the routing toll. As examples, the network appliance may be included along the path or be one of the devices coupled to a particular connection. Many variations are possible.

In one example, the data is packaged as a unit. For instance, the data is packaged in a packet that may be routed through the network. In one example, the packet is included in a frame and that frame is routed from the source through the network fabric (e.g., switched fabric 320) to the destination. The frame includes information used in the routing, and in accordance with an aspect of the present invention, includes information relating to tolling (e.g., the determining of costs associated with the routing).

Figure 4A:
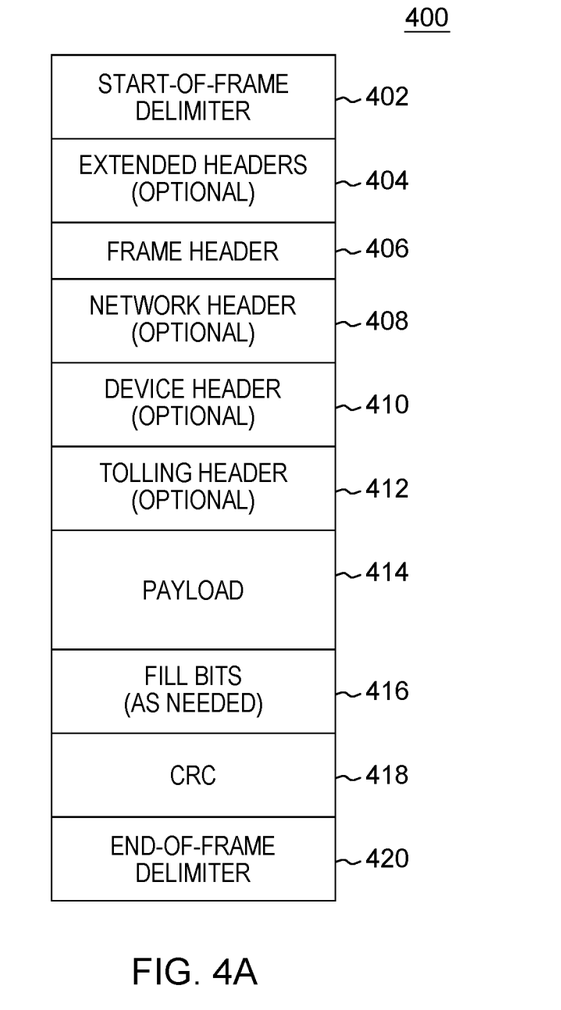
FIG. 4A depicts one example of a frame used in accordance with one or more aspects of the present invention.
Figure 4B:
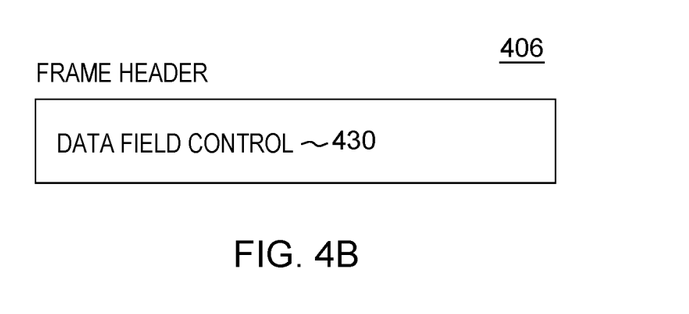
FIG. 4B depicts one example of a frame header used in accordance with one or more aspects of the present invention.
Figure 4C:
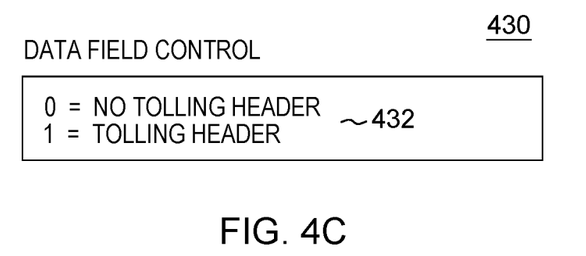
FIG. 4C depicts one example of a data field control of the frame header of FIG. 4B, in accordance with one or more aspects of the present invention.
Figure 4D:
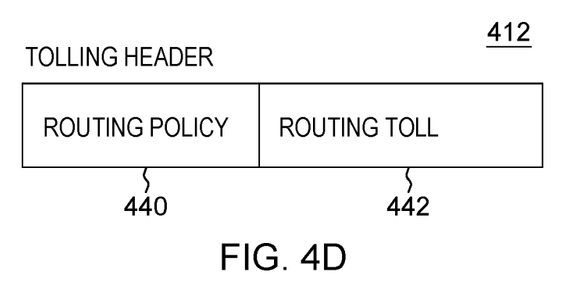
FIG. 4D depicts one example of a tolling header of the frame of FIG. 4A used in accordance with one or more aspects of the present invention.

One example of a frame used in accordance with one or more aspects of the present invention is described with reference to FIGS. 4A-4D. For instance, FIG. 4A depicts example fields of a frame used in accordance with one or more aspects of the present invention; FIG. 4B depicts one example of a frame header of the frame of FIG. 4A; FIG. 4C depicts one example of a data field control of the frame header of FIG. 4B; and FIG. 4D depicts one example of a tolling header of the frame of FIG. 4A. Although examples of a frame and a tolling header are described, other configurations and/or types of frames and/or tolling headers may be used. A frame may include additional, fewer and/or other fields. Similarly, a tolling header (or other headers of the frame) may include additional, fewer and/or other fields. One or more aspects of the present invention may be used with different frames, frame configurations, frame types, and/or different headers, header configurations, header types, etc. Many variations are possible.

Referring to FIG. 4A, in one example, a frame 400 includes, for instance, one or more headers used in sending a packet, in the form of payload, from a source to a destination. Although various headers are depicted in the example, these are only examples. In other examples, additional, fewer and/or other headers may be included in a frame. Further, a frame that includes a header may include the fields of the header as part of the frame and/or include an indication (e.g., address, pointer, etc.) of the header and/or an indication of one or more of the fields of the header. Various examples are possible.

In one example, frame 400 includes a start-of-frame delimiter 402 to be used to indicate the start of a frame; one or more optional extended headers 404 used to provide selected information; a frame header 406 used to, e.g., control link operation, control device protocol transfers, and to detect missing frames or frames that are out of order; an optional network header 408 used to provide selected network information; an optional device header 410 used to provide selected device information; an optional tolling header 412, which, when included, is used to determine a routing toll for the packet, in accordance with one or more aspects of the present invention; a payload 414 which includes the data; one or more fill bits 416, as needed, to ensure the data field (which includes, e.g., the network header, if included; the device header, if included; the tolling header, if included; the payload; and the fill bits) is an integer multiple of, e.g., four bytes; a cyclic redundancy check (CRC) 418 to be used for integrity checking of fields within the frame; and an end-of-frame delimiter 420 to be used to specify the end of the frame. Further details relating to one or more headers used in accordance with one or more aspects of the present invention are described below.

For instance, frame header 406 includes one or more fields used to specify certain controls and/or the presence of optional headers used in routing the frame. As an example, in accordance with an aspect of the present invention and referring to FIG. 4B, frame header 406 includes a data field control field 430 (e.g., in word 3, bits 16-23; or in other locations) that specifies whether certain optional headers are present. For instance, with reference to FIG. 4C, data field control field 430 includes one or more indicators and/or fields. As an example, in accordance with an aspect of the present invention, data field control field 430 includes a tolling header indicator 432 (e.g., in word 18 or 19 or in another location). As an example, tolling header indicator 432 is a bit that when set to one value (e.g., 0), indicates no tolling header, and when set to another value (e.g., 1), indicates a tolling header. Tolling header indicator 432 may have other configurations including, but not limited to, multiple bits or other configurations. Further, data field control 430 may include additional and/or other fields, one or more of which may be used to indicate if other headers are present in the frame. Moreover, frame header 406 may include additional and/or other controls and/or information. The controls described herein are examples of controls used in one or more aspects of the present invention.

Based on tolling header indicator 432 specifying that a tolling header is included in the frame, the tolling header is used in determining tolls associated with traversing a network. In one example, referring to FIG. 4D, a tolling header 412 includes one or more fields. For instance, tolling header 412 includes a routing policy field 440 that optionally specifies one or more traversal policies for the frame and a routing toll field 442 that is adjusted as the packet traverses the network from a source to a destination. In one example, the routing toll field includes an accumulated toll which accumulates the toll values for the paths (e.g., connections and/or other components of the paths) that are traversed for a particular route from a source to a destination. Tolling header 412 may include additional, fewer and/or other fields; the tolling header depicted in FIG. 4D is only one example.

Although one example of specifying the tolling header is described, in other examples, other frame formats and/or structures may be used to indicate the presence of a tolling header and/or include the tolling header. Many variations are possible.

Figure 5:
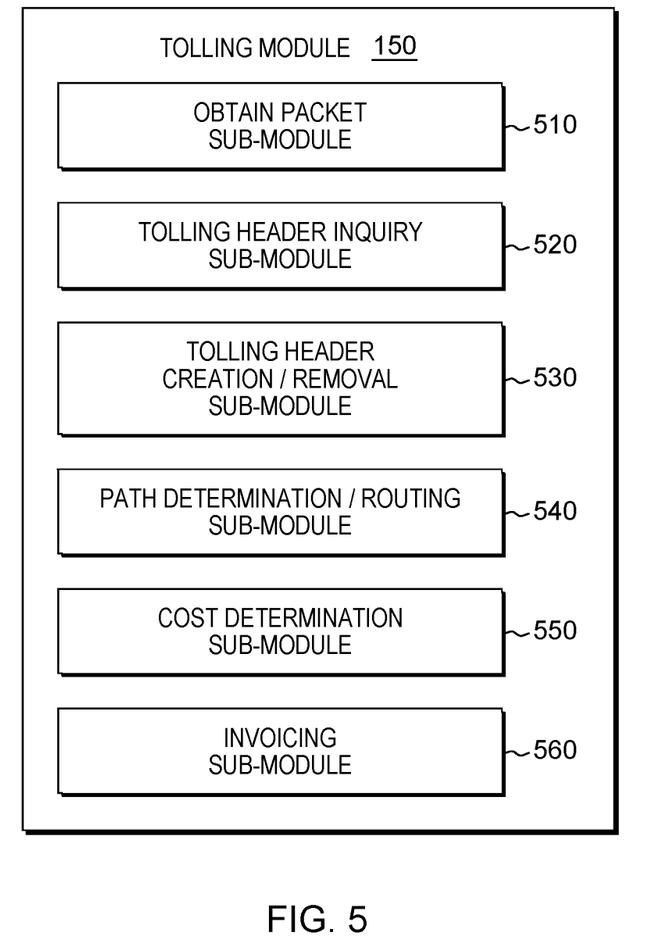
FIG. 5 depicts one example of sub-modules of a tolling module of FIG. 1, in accordance with one or more aspects of the present invention.
Figure 6:
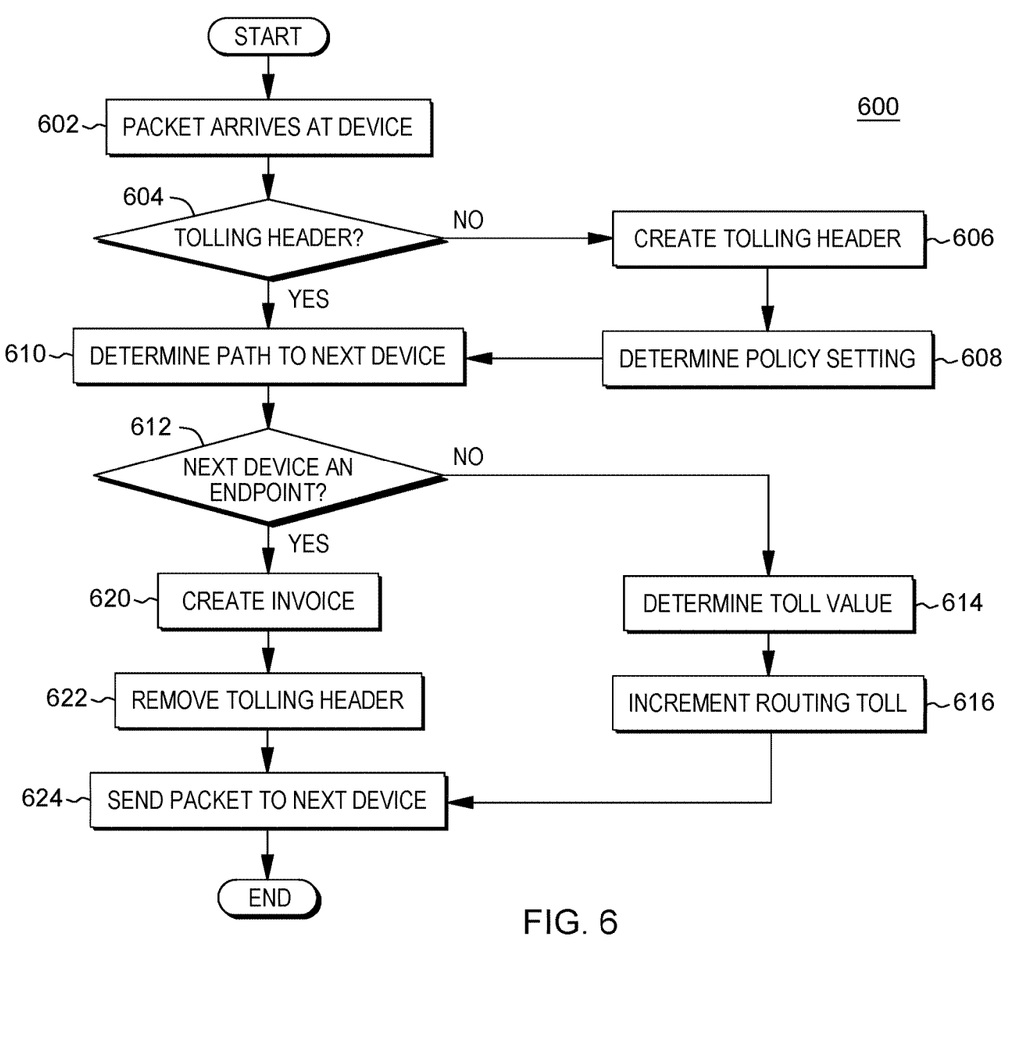
FIG. 6 depicts one example of processing to perform automated tolling, in accordance with one or more aspects of the present invention.

Further details relating to using the tolling header are described with reference to FIGS. 5-6. FIG. 5 depicts further details of a tolling module (e.g., tolling module 150 of FIG. 1) that includes code or instructions used to perform tolling (e.g., automated tolling), in accordance with one or more aspects of the present invention, and FIG. 6 depicts one embodiment of a process to perform tolling (e.g., automated tolling) using the tolling header, in accordance with one or more aspects of the present invention.

In one or more aspects, referring to FIG. 5, a tolling module (e.g., tolling module 150) includes, in one example, various sub-modules to be used to perform tolling. The sub-modules are, e.g., computer readable program code (e.g., instructions) in computer readable media, e.g., persistent storage (e.g., persistent storage 113, such as a disk or tape) and/or a cache (e.g., cache 121), as examples. The computer readable media may be part of a computer program product and may be executed by and/or using one or more computers, such as computer(s) 101; processors, such as a processor of processor set 110; and/or processing circuitry, such as processing circuitry of processor set 110; and/or processing circuitry, a processor and/or a computer of a device of a storage network providing storage (e.g., storage 124), etc.

Example sub-modules of tolling module 150 include, for instance, an obtain packet sub-module 510 to be used to obtain a packet to be routed from a source to a destination; a tolling header inquiry sub-module 520 to be used to determine whether the packet has a tolling header; a tolling header creation/removal sub-module 530 to be used to create a tolling header and/or to remove a tolling header from a packet; a path determination/routing sub-module 540 to be used to determine one or more paths for the packet and to route the packet through a network; a cost determination sub-module 550 to be used to determine the cost of traversing a network; and an invoicing sub-model 560 to be used to provide an amount of the tolling. Although various sub-modules are described, a tolling module, such as tolling module 150, may include additional, fewer and/or different sub-modules. A particular sub-module may include additional code, including code of other sub-modules, or less code. Many variations are possible.

The sub-modules are used, in accordance with one or more aspects of the present invention, to determine a toll (e.g., a cost) associated with routing a packet from a source to a destination. Further, in one or more aspects, one or more of the sub-modules are used to determine a routing policy for a packet to be routed. The cost determination and routing policy are further described with reference to FIG. 6.

FIG. 6 depicts one example of a process to determine a toll and/or routing policies, in accordance with one or more aspects of the present invention. The process is executed, in one or more examples, by a processor or processing circuitry within a device receiving the packet, such as a network device or other device. In one example, code or instructions implementing the process are part of a module, such as module 150. In other examples, the code may be included in one or more modules and/or in one or more sub-modules of the one or more modules. Various options are available.

As one example, a process 600 executing on a device (e.g., a network device, endpoint device) obtains (e.g., receives, is sent, is provided, retrieves, creates, etc.) 602 a packet sent to the device. Process 600 determines 604 whether the packet has a tolling header. If the packet does not have a tolling header, process 600 creates 606 a tolling header (e.g., tolling header 412), in accordance with one or more aspects, and initializes, e.g., a routing toll (e.g., routing toll field 442). In one example, it is initialized to zero. However, in other examples, it is initialized to other values. Further, in accordance with one or more aspects, process 600 determines 608 a routing policy setting for the packet. This determination is made based on, for instance, one or more policies, such as one or more invoicing policies for one or more selected entities, such as, for instance, an owner of the packet at the source device, an owner of the packet at the destination device and/or other selected entities. As an example, one invoicing policy may indicate that the fastest route is to be taken regardless of cost; another invoicing policy may be that the least expensive route is to be taken; another invoicing policy may be that the fastest route is to be taken during peak hours, but the least expensive route is to be taken during non-peak hours, etc. Many invoicing policies may be defined and used to determine routing policies. Those provided herein are just examples.

Based on determining the one or more routing policies for the packet, a routing policy indicator is set in the tolling header. For instance, routing policy field 440 of tolling header 412 is set to indicate the one or more selected routing policies. Based on the one or more routing policies indicated in the tolling header (either just created or in a previously created header), process 600 determines 610 a path to the next device in the route.

Process 600 determines 612 whether the next device is an endpoint. For instance, process 600 checks if the port being sent to next (i.e., the next device) is the destination port. (In other examples, other checks are made.) If the destination port is not next, then the next device is not an endpoint. Thus, process 600 determines 614 at least one toll value (e.g., a toll value for a connection, an appliance, and/or a device, etc.) for that path and applies that toll value to the routing toll. For instance, process 600 increments 616 a routing toll within, e.g., the tolling header (e.g., routing toll 442 of tolling header 412) by the at least one toll value. The packet is then sent 624 to the next device, and the processing is repeated (at, e.g., 602).

Returning to inquiry 612, if the next device is the endpoint (e.g., destination port is next), then process 600 creates 620 at least one invoice to be provided to one or more selected entities. This includes, for instance, including the routing toll (from, e.g., routing toll 442) or a portion of it in an invoice to be sent to the source device, the target device and/or other selected entities depending on the invoicing policies, and/or using the routing toll to determine the toll to be used to invoice the one or more selected entities. In one example, the toll is invoiced to one entity, such as the owner of the packet at the source device or the owner of the packet at the destination device. In another example, one portion of the toll is invoiced to one entity and another portion of the toll is invoiced to another entity. Further examples are also possible. The invoice(s) may be sent to the one or more selected entities using process 600 and/or one or more other processes.

Further, in one example, process 600 removes 622 the tolling header from the frame, and sends 624 the packet to the endpoint device.

As described herein, in one or more aspects, a tolling capability is provided in which, in one example, a packet enters a network, such as a storage area network, and is received by a device. Based on the device receiving the packet, the device looks up the invoicing policy of the source device (or one or more other selected entities), sets the routing policy indicator in the tolling header based on the device owner's policy, determines the route to the next device using the routing policy indicator, adjusts (e.g., increases) the routing toll in the tolling header based on at least one toll value of the route, and then sends the packet to the next device. If the next device is an endpoint device, the header is removed, and the routing toll is, e.g., added to the policy owner's bill, as an example.

One or more aspects of the present invention relate to computer technology and/or facilitating processing within a computer. By using a tolling header in a frame in routing a packet, appropriate policy and/or costs are determined facilitating use of Infrastructure as a Service. This facilitates processing relating to a processor, computer system and/or computing environment.

Although various embodiments are described herein, other aspects, variations and/or embodiments are possible. For instance, other types of network devices may be used including, but not limited to, routers, security appliances, network appliances with security features, analytic appliances, etc. Further, one or more of these and/or other network devices, devices and/or connections described herein may have a toll value assigned thereto, which contributes to the toll to be invoiced. Other variations are also possible.

The computing environments described herein are only examples of computing environments that can be used. Although various examples of computing environments are described herein, one or more aspects of the present invention may be used with many types of environments. The computing environments provided herein are only examples. Each computing environment is capable of being configured to include one or more aspects of the present invention. For instance, each may be configured to provide an automated tolling process and/or to perform to one or more other aspects of the present invention.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other mechanisms for tolling, in lieu of or in addition to using weights and/or costs for each connection or other components may be considered. Further, different types and/or configurations of frames and/or headers of frames may be used. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
   obtaining, at one device of a network, a packet of data;
   determining a path from the one device to a next device of the network;
   determining at least one toll value for the path from the one device to the next device; and
   adjusting, based on the at least one toll value for the path from the one device to the next device, a routing toll, the routing toll being stored in a frame used in routing the packet of data in the network.

2. The computer-implemented method of claim 1, wherein the determining the path from the one device to the next device uses a routing policy provided with the packet of data.

3. The computer-implemented method of claim 2, wherein the routing policy is included in a tolling header of the frame, the frame including the packet of data.

4. The computer-implemented method of claim 1, wherein the frame includes the packet of data and a tolling header, the tolling header including the routing toll.

5. The computer-implemented method of claim 4, wherein the tolling header includes a routing policy, the routing policy to be used to determine the path from the one device to the next device.

6. The computer-implemented method of claim 4, wherein the adjusting the routing toll includes incrementing the routing toll in the tolling header based on the at least one toll value.

7. The computer-implemented method of claim 1, further comprising:
   determining whether the next device is an endpoint device; and
   determining, based on the next device being the endpoint device, an amount for a toll to route the packet of data in the network, the determining being based on the routing toll.

8. The computer-implemented method of claim 7, wherein the frame includes a tolling header to store the routing toll used in determining the amount for the toll, and wherein the method further comprises:
   removing the tolling header from the frame, based on determining that the next device is an endpoint device; and
   sending the packet of data to the endpoint device, the sending using the frame absent the tolling header.

9. The computer-implemented method of claim 1, further comprising:
   determining whether the frame includes a tolling header, based on obtaining the packet of data; and
   creating the tolling header for the frame, based on determining that the frame does not include the tolling header, the tolling header to include the routing toll.

10. The computer-implemented method of claim 9, further comprising:
    determining, based on one or more policies, a routing policy to route the packet of data in the network; and
    including an indication of the routing policy in the tolling header.

11. A computer system for facilitating processing within a computing environment, the computer system comprising:
    a network of devices, and wherein the computer system is configured to perform a method, said method comprising:
    obtaining, at one device of the network of devices, a packet of data;
    determining a path from the one device to a next device of the network of devices;
    determining at least one toll value for the path from the one device to the next device; and
    adjusting, based on the at least one toll value for the path from the one device to the next device, a routing toll, the routing toll being stored in a frame used in routing the packet of data in the network of devices.

12. The computer system of claim 11, wherein the determining the path from the one device to the next device uses a routing policy provided with the packet of data.

13. The computer system of claim 12, wherein the routing policy is included in a tolling header of the frame, the frame including the packet of data.

14. The computer system of claim 11, wherein the frame includes the packet of data and a tolling header, the tolling header including the routing toll.

15. The computer system of claim 14, wherein the tolling header includes a routing policy, the routing policy to be used to determine the path from the one device to the next device.

16. A computer program product for facilitating processing within a computing environment, said computer program product comprising:
    one or more computer readable storage media and program instructions collectively stored on the one or more computer readable storage media readable by at least one processing circuit to perform a method comprising:
    obtaining, at one device of a network, a packet of data;
    determining a path from the one device to a next device of the network;
    determining at least one toll value for the path from the one device to the next device; and
    adjusting, based on the at least one toll value for the path from the one device to the next device, a routing toll, the routing toll being stored in a frame used in routing the packet of data in the network of devices.

17. The computer program product of claim 16, wherein the determining the path from the one device to the next device uses a routing policy provided with the packet of data.

18. The computer program product of claim 17, wherein the routing policy is included in a tolling header of the frame, the frame including the packet of data.

19. The computer program product of claim 16, wherein the frame includes the packet of data and a tolling header, the tolling header including the routing toll.

20. The computer program product of claim 19, wherein the tolling header includes a routing policy, the routing policy to be used to determine the path from the one device to the next device.

* * * * *